United States Patent

[11] 3,604,256

[72] Inventor Michael Prats
 Houston, Tex.
[21] Appl. No. 795,408
[22] Filed Jan. 31, 1969
[45] Patented Sept. 14, 1971
[73] Assignee Shell Oil Company
 New York, N.Y.

[54] METHOD FOR MEASURING THE AVERAGE VERTICAL PERMEABILITY OF A SUBTERRANEAN EARTH FORMATION
 7 Claims, 4 Drawing Figs.

[52] U.S. Cl. ................................................. 73/155
[51] Int. Cl. ............................................. E21b 47/10
[50] Field of Search ........................................ 73/155

[56] References Cited
 UNITED STATES PATENTS
 3,285,064 11/1966 Greenkorn et al. ............ 73/155

3,332,483 7/1967 Wyllie .......................... 73/155 X

*Primary Examiner*—Jerry W. Myracle
*Attorneys*—Louis J. Bovasso and J. H. McCarthy ABSTRACT: A method for measuring the average vertical permeability of a subterranean earth formation by extending a well borehole into the earth formation and sealing off the well borehole at least adjacent to the portion of the formation desired to be measured. The sealed-off portion of the well borehole is perforated at least at two vertically spaced points in the well borehole and the well borehole is sealed off between the perforations. Fluid is then flowed at a substantially constant rate through one of the perforations at one of the points while the pressure response in the well borehole is measured at the perforations of the other of the points without flowing fluid through the latter perforation.

INVENTOR:
MICHAEL PRATS
BY: *Louis J Bovasso*
HIS ATTORNEY

METHOD FOR MEASURING THE AVERAGE VERTICAL PERMEABILITY OF A SUBTERRANEAN EARTH FORMATION

BACKGROUND OF THE INVENTION

1. Field of the Invention

This invention relates to well testing; and, more particularly, to a method for measuring the average vertical permeability of a subterranean earth formation.

2. Description of the Prior Art

Knowledge about the vertical permeability of oil and gas producing formations is sometimes necessary to properly anticipate the production performance of a subterranean reservoir. The spacing of wells, the rates of production, stimulation procedures, and pressure maintenance programs, for both primary and secondary recovery, are based to a large extent upon a determination or estimation of such reservoir heterogeneities.

Various techniques are currently available to the industry for testing and measuring the behavior of reservoir fluids and matrices. However, other than the use of vertical permeability measurements on cores recovered from a subterranean earth formation, no prior art method is available for determining the vertical permeability of a formation. This is in contrast to the numerous methods for analyzing pressure responses to obtain the average horizontal permeability of reservoirs. Core measurements of vertical permeability do not necessarily represent effective in situ values. Cores may be representative of only localized pockets of high or low permeability, and total reliance on cores might overlook the presence of vertical fractures or of extensive impermeable oil shale streaks.

SUMMARY OF THE INVENTION

It is an object of this invention to provide a method for measuring the average vertical permeability of a subterranean earth formation.

It is a further object of this invention to provide a method for measuring the average vertical permeability of a subterranean earth formation utilizing a single well borehole.

These objects are preferably accomplished by extending a well borehole into a subterranean earth formation and sealing off the well borehole at least adjacent to the portion of the formation desired to be measured. The sealed-off portion of the well borehole is perforated at least at two vertically spaced points in the well borehole and the well borehole is packed off between the perforations. Fluid is then flowed at a substantially constant rate through one of the perforations at one of the points while the pressure response in the well borehole is measured at the other of the points without flowing fluid through the latter perforation.

DESCRIPTION OF THE PREFERRED EMBODIMENTS

Figure 1:
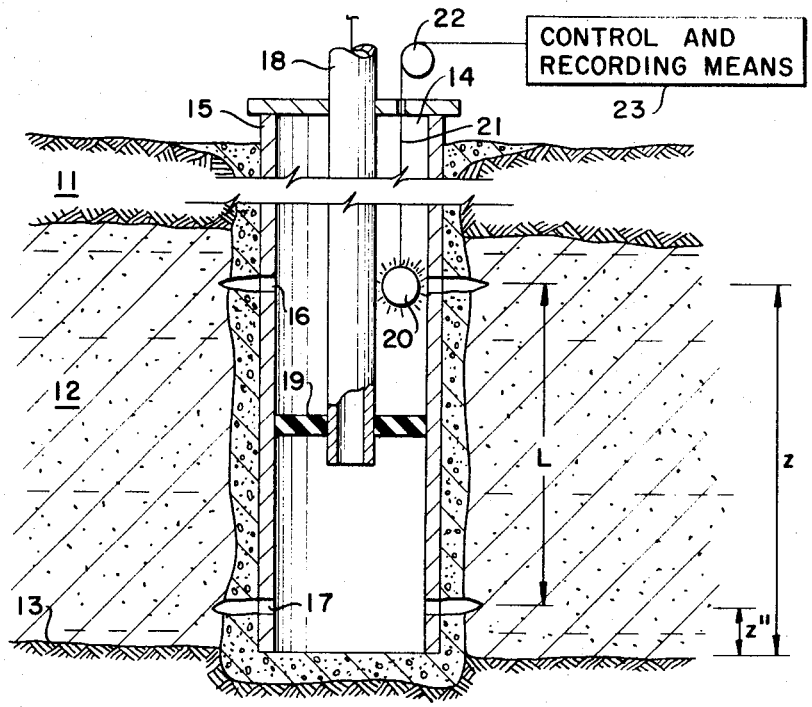
FIG. 1 is a vertical sectional view of a well borehole in accordance with the teachings of my invention.

Referring now to the drawing, FIG. 1 shows earth formation 11 overlying a subterranean hydrocarbon-bearing formation 12. The hydrocarbon-bearing formation 12 is confined by lower layer 13. A well borehole 14 is sealed off adjacent to the portion of the formation 12 it is desired to measure. For example, well borehole 14 is preferably cased with casing 15 cemented therein as is well known in the art. Casing 15 is cemented throughout the production interval desired to be measured in such a manner that there is no communication (other than through formation 12) between the injection and measuring intervals as will be discussed further hereinbelow.

Well borehole 14 is preferably perforated at perforations 16 and 17 by any means known in the art. Perforation 16 is preferably disposed in the well borehole 14 adjacent substantially to the top of formation 12 while perforation 17 is preferably disposed substantially at the bottom of formation 12, as can be seen in FIG. 1. The distance L between perforations 16 and 17 is preferably no less than about 25 well borehole radii. Finally, although only two such perforations 16 and 17 have been shown, obviously a plurality of perforations may be disposed substantially adjacent to the top and bottom of the formation 12 as long as each pattern of perforations is close enough such that the injection and measuring intervals (perforations 17 and 16, respectively, as will be explained further hereinbelow) are relatively short compared to the distance between them, i.e. around 10 percent or less of the distance L. Thus, the well borehole 14 must not be perforated extensively over the producing interval desired to be measured. However, although it is indicated that well borehole 14 is preferably cased over its entire extent adjacent to the producing interval desired to be measured, thereby excluding well boreholes that are completed open holes, large selected areas of such open well boreholes may be temporarily sealed, such as by the use of large inflatable packers, as is well known in the art.

In either case, there must be no communication behind the well casing 15 between the perforations 16 and 17. Thus, the concepts of this invention may not be applicable to gravel-packed intervals or poorly cemented well boreholes unless such boreholes are sealed as discussed hereinabove.

Preferably, the method of my invention is applied to subterranean hydrocarbon-bearing reservoirs having single mobile fluid at a uniform pressure, for example a new oil reservoir having no free gas saturation. However, effective fluid properties, and even relative permeability information, may be used in interpreting results when more than a single mobile fluid is present in the formation. Such methods are available for conventional pressure buildup interpretation, and are also applicable here.

Figure 2:
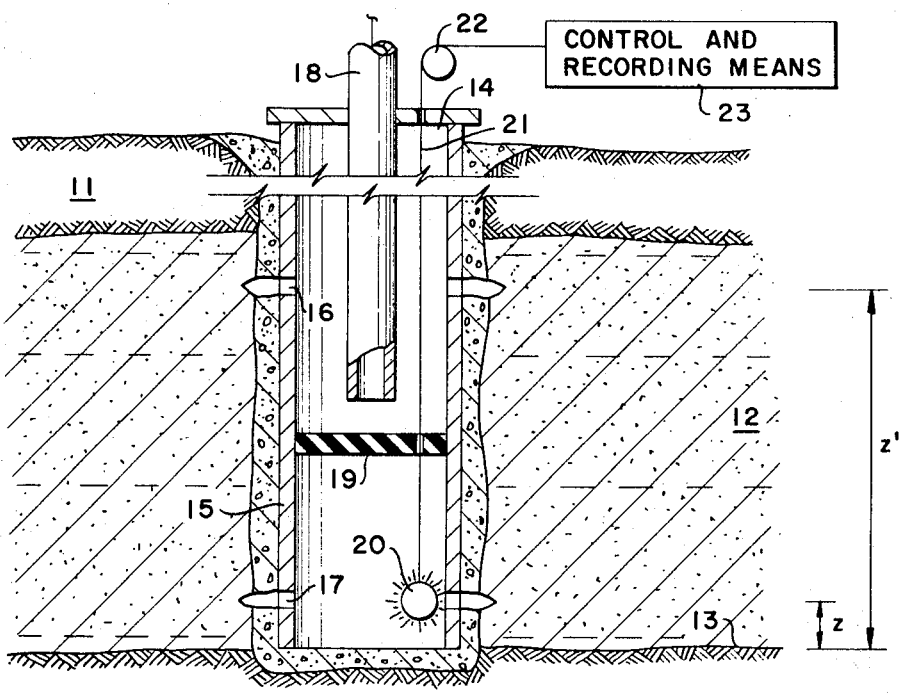
FIG. 2 is a vertical sectional view of an alternate method of my invention applied to the well borehole of FIG. 1.

Referring once again to FIG. 1, a fluid, as for example formation fluid or the like, is flowed through perforation 17. This may be accomplished by injecting such fluid down tubing string 18 past packer 19 as is well known in the art. It can be seen in FIG. 1 that packer 19 and well casing 15 seals perforation 16 from perforation 17 so that any pressure response at perforation 16 is transmitted solely through formation 12. Alternately, as shown in FIG. 2, wherein like numerals refer to like parts of FIG. 1, fluid may be injected down tubing string 18 above packer 19 and through perforation 16 into formation 12. In both cases, instead of injecting fluid through the perforations, formation fluid may be flowed from formation 12, out the respective perforation (e.g. perforation 17 in FIG. 1) and out of the tubing string 18.

The fluid is either produced or injected at substantially a constant mass rate of flow through a short interval (e.g. perforation 17 in FIG. 1) near the top or bottom of formation 12 (FIGS. 2 and 1, respectively) with the pressure response being measured through another short interval in the same well borehole 14 (e.g. perforation 16 in FIG. 1 and perforation 17 in FIG. 2), which perforation is packed off from the first, without either producing or injecting fluid through the latter perforations. This may be accomplished by lowering a conventional pressure-sensitive device such as a pressure gauge 20 attached to line 21 down well borehole 14 into communication with the perforation being measured (perforation 16 in FIG. 1 and perforation 17 in FIG. 2). Line 21 may be raised and lowered in well borehole 14 by means of a winch 22 or similar device, coupled to a surface control and recording means 23.

For purposes of determining the average vertical permeability of formation 12 from the information derived from means 23, the formation 12 is considered to extend horizontally from well borehole 14 to infinity, to be of uniform thickness h, to be filled with a single mobile liquid of constant compressibility c and viscosity $\mu$ at an initially uniform pressure $\pi$ and to have uniform porosity . The permeability anisotropy of formation 12 is considered, one of the principal axes being vertical. In the horizontal plane, permeabilities are equal in all directions, whereas the vertical permeability $k_v$ can have any constant value. It is desired, in accordance with the teachings of my invention, to measure $k_v$ in situ.

Any method in which it is desired to determine the average vertical permeability of a formation must involve vertical fluid flow over the region being measured. In operation in the field, operating practice generally results in fluids flowing parallel to the formation bedding planes rather than normal to them. In order to determine the average vertical permeability of a formation then, it is necessary to develop a test involving the vertical flow of fluids over the region being measured.

Thus, in accordance with my invention, withdrawal or injection of fluid from a reservoir through a single perforation is one way to obtain some vertical flow in the neighborhood of the well borehole. By making a second perforation, separated from the first by a packer, the vertical pressure response of the formation may be measured. Production of fluids through the perforation used to measure the pressure response is not necessary. It is in fact undesirable, since the measured pressure would be subject to skin effects if fluids are produced. Since the purpose of the second perforation is only to transmit pressure to a pressure-sensitive device such as gauge 20, such perforation is not considered as a perforation at all in the foregoing computations. On the other hand, in the following computations, the perforation through which the fluid is flowed is represented mathematically as a point source.

The actual well borehole 14 is considered to have a zero radius. The justification for this assumption is that it has been found mathematically that the disturbance of formation 12 from well borehole 14 dies out with increasing distance from the well borehole 14. Thus, it has been found that, for large times, the size of the well borehole 14 does not affect pressures measured at its wall, provided that the pressure is measured at a distance of at least about 25 $r_w k_v/k_h$ from the injection perforation ($r_w$ = the radius of the well, $k_h$ = horizontal permeability, and $k_v$ = vertical permeability).

COMPUTATIONS FOR LARGE TIME PRESSURE RESPONSE

In all of the following computations, reference may be had to the following table of symbols.

SYMBOLS

| | |
|---|---|
| $c$ | fluid compressibility, a constant |
| $F(Z,Z')$ | geometrical function which depends on the position of the injection (production) and measuring intervals from the vertical boundaries of the reservoir |
| $h$ | formation thickness |
| $k_h, k_v$ | horizontal and vertical permeabilities, respectively |
| $\ln$ | logarithm to base $e$ |
| $\log$ | logarithm to base 10 |
| $p^*$ | indicates the Laplace Transform of $p$ |
| $p_D$ | $\dfrac{4(p_w - p_i)}{q\mu} \pi h k_h$ |
| $p_i$ | initial formation pressure |
| $p_w$ | pressure measured at perforation located at $z$ |
| $q$ | injection rate when positive, production rate when negative |
| $R$ | $(k_r r_w^2)/(k_h a h^2)$ |
| $r_D$ | $r/r_w$ |
| $r, \theta, z$ | cylindrical coordinates |
| $t_D$ | $(k_h t)/(\mu c r_w^2)$ |
| $x, y, z$ | Cartesian coordinates |
| $Z$ | $z/h$ |
| $Z'$ | $z'/h$ |
| $z$ | location of perforation, measured from the bottom of the reservoir, at which pressure is measured |
| $z'$ | location of producing (or injecting) perforation measured from the bottom of the reservoir |
| $z_D$ | $(z/r_w)\sqrt{k_h/k_v}$ |
| $\Delta p$ | $p_w - p_i$ |
| $\Delta p(1)$ | $\Delta p$ at 1 hour |
| $\mu$ | fluid viscosity |
| $\phi$ | porosity |
| $\tau$ | $Rt_D$ |
| $\psi(x)$ | the digamma function, equal to the logarithmic derivative of the gamma function |

The pressure rise at any point of space and time due to a continuous point source of magnitude $q$ at $(x', y', z')$ [where $q$ = injection rate when positive and production rate when negative, and $x', y', z'$ = Cartesian coordinates of the well borehole at the location of the producing (or injecting) perforation measured from the bottom of the reservoir] and placed in an anisotropic infinite medium of permeability $k_h$ in the $x, y$ plane and permeability $k_r$ normal to the $z = 0$ plane is $$p(x, y, z, t; x', y', z') - p_i = \frac{q\mu\sqrt{\phi\mu c}}{8k_a\sqrt{k_v}\pi^{3/2}} \int_0^t$$

$$\exp\left\{-\frac{\phi\mu c}{4}\left[\frac{(x-x')^2}{t'k_h} + \frac{(y-y')^2}{t'k_h} + \frac{(z-z')^2}{t'k_v}\right]\right\} \frac{dt'}{t'^{3/2}} \quad (1)$$

When the point source is at $x' = y' = 0$, the pressure at $x=y=0$ is $$p(0, 0, z, t; 0, 0, z')p_i = \frac{q\mu}{4\pi k_h|z-z'|} erfc\sqrt{\frac{\phi\mu c(z-z')^2}{4k_v t}} \quad (2)$$

In terms of the dimensions variables $Z, Z', \tau$ and $p_D$, equation (2) is given by $$p_D(Z, \tau; Z') = \frac{1}{|Z-Z'|} erfc \frac{|Z-Z'|}{2\sqrt{\tau}} \quad (3)$$

The method of images and equation (3) are now used to determine the pressure at $x=y=0$ due to the continuous point source in a vertically bounded reservoir with no flow across $Z=0$ ($z=0$) and $Z=1$ ($z=h$). The result is $$p_D(Z, \tau; Z') = \sum_{n=-\infty}^{\infty} \frac{erfc \frac{|Z-Z'-2n|}{2\sqrt{\tau}}}{|Z-Z'-2n|} + \frac{erfc \frac{|Z+Z'-2n|}{2\sqrt{\tau}}}{|Z+Z'-2n|} \quad (4)$$

For convenience in evaluating equation (4) at large values of $\tau$, we first take its Laplace Transform $$p_D^*(Z, s; Z') = \frac{1}{s} \sum_{n=-\infty}^{\infty} \frac{e^{-|z-z'-2n|\sqrt{s}}}{|Z-Z'-2n|} + \frac{e^{-|z+z'-2n|\sqrt{s}}}{|Z+Z'-2n|} \quad (5)$$

which can be rewritten as $$p_D^*(Z, s; Z') = \frac{1}{s} \sum_{n=-\infty}^{\infty} \int_{\sqrt{s}}^{\infty} [e^{-|z-z'-2n|u} + e^{-|z+z'-2n|u}] du \quad (6)$$

The order of the integration and summation is interchanged to obtain $$p_D^*(Z, s; Z') = \frac{e^{-|z-z'|\sqrt{s}}}{s|Z-Z'|} + \frac{e^{-|z+z'|\sqrt{s}}}{s|Z+Z'|}$$

$$+ \frac{1}{s} \int_{\sqrt{s}}^{\infty} \sum_{i=1}^{4} e^{(a_i-1)u} \sum_{n=1}^{\infty} (e^{-2u})^n du \quad (7)$$

with $$a_i = 1 \pm Z \pm Z' \quad (8)$$

$$p_D^*(Z, s; Z') = \frac{e^{-|z-z'|\sqrt{s}}}{s|Z-Z'|} + \frac{e^{-|z+z'|\sqrt{s}}}{s|Z+Z'|} \quad (9)$$

$$-\frac{1}{2s}\int_{\sqrt{s}}^{\infty}\sum_{i=1}^{4} e^{-a_i u}\left(\frac{1}{u} - cschu\right)du + \frac{1}{2s}\int_{\sqrt{s}}^{\infty}\sum_{i=1}^{4} e^{-a_i u}\frac{du}{u}$$

$$= M(s) - \frac{1}{s}N(\infty) + \frac{1}{s}N(s) + S(s) \quad (10)$$

$$M(s) = \frac{e^{-|z-z'|\sqrt{s}}}{s|Z-Z'|} + \frac{e^{-|z+z'|\sqrt{s}}}{s|Z-Z'|} \quad (11)$$

$$N(s) = \frac{1}{2}\int_0^{\sqrt{s}} \sum_{i=1}^{4} e^{-a_i u}\left(\frac{1}{u} - csch\, u\right) du \quad (12)$$

$$S(s) = \frac{1}{2s}\sum_{i=1}^{4} -E_i[-(a_i)\sqrt{s}] \quad (13)$$

$$= \frac{-1}{2s}\sum_{i=1}^{4}\left[\gamma - ln\, a_i\sqrt{s} + \sum_{k=1}^{\infty}\frac{(-a_i\sqrt{s})^k}{k\cdot k!}\right]$$

$$= \frac{-2\gamma}{s} - \frac{1}{s}\, ln s - \frac{1}{2s}\sum_{i=1}^{4} ln\, a_i - \sum_{i=1}^{4}\sum_{k=1}^{\infty}\frac{(-a_i\sqrt{s})^k}{k\cdot k!}. \quad (14)$$

From these definitions and equation (9) it follows that for large values of $\tau$, which correspond to small values of $s$, $$\lim_{\tau \to \infty} \mathcal{L}^{-1}\left[p_D*(Z,s;Z') + \frac{1}{s}\, ln s\right] = F(Z,Z') - \gamma \quad (15)$$

$$= \frac{1}{|Z-Z'|} + \frac{1}{Z+Z'} - N(\infty) - 2\gamma - \frac{1}{2}\sum_{i=1}^{4} ln\, a_i \quad (16)$$

The infinite integral $N(\infty)$ defined by equation (12) is of the Laplace Transform type and is found to be $$N(\infty) = 2ln2 + \frac{1}{2}\sum_{i=1}^{4} \Psi\left(\frac{a_i+1}{2} - \frac{1}{2}\right) \sum_{i=1}^{4} ln\, a_i \quad (17)$$

in Erdelyi, A., Magnus, W., Oberhettinger, F., and Tricomi, F. G., (1954), *Bateman Manuscript Project*, Tables of Integral Transform, v. 1, McGraw-Hill, page 163.

Thus, the large time behavior of the pressure is $$p_D(Z,\pi;Z') = F(Z,Z') + \ln \pi \quad (18)$$

$$F(Z,Z') = \frac{1}{|Z-Z'|} + \frac{1}{Z+Z'} - 2\ln 2 - \gamma - \frac{1}{2}\sum_{i=1}^{4} \Psi\left(\frac{a_i+1}{2}\right) \quad (19)$$

Equation (18) can be expressed as the following equation by expressing the dimensionless variables in practical units. Thus, the large time pressure response $p$ at a point $z$ on the axis of a well of zero radius in a formation of thickness H due to a point source at $z'$ also on the axis of that well and producing at a constant mass rate of flow is given in practical units (p.s.i., cp., md., ft., hr. B/D) by $$p_w - p_i = \frac{70.6q\mu}{hk_h}\left[F(z/h, z'/h) + 2.303\, \log\frac{k_v}{\phi\mu ch^2} - 8.241\right]$$

$$+ 162.6\frac{q\mu}{hk_h}\, \log t \quad (20)$$

It is noted that the only quantity containing the vertical permeability is the second term on the right-hand side of equation (20). The function $F(z/h, z'/h)$, which depends only on the position of the producing and measuring perforations relative to the vertical boundaries of the formation, is presented in graphical form in FIG. 3.

In summary, the preferred procedure to obtain the vertical permeability under the conditions considered in this application is:

1. Perforate cased well borehole 14 near top and bottom of the formation 12 of known thickness $h$ and determine $z/h$ and $z'$ from the positions of the perforations with respect to the sand interval;

2. Set a packer 19 with tubing string 18 between the two perforations 16 and 17;

3. Inject (or produce) formation liquid through the perforation (perforation 17 of FIG. 1, for example) at $z'$ and measure the pressure through the other perforation (i.e., perforation 16 of FIG. 1) at $z$ as a function of time;

4. Plot the pressure rise (drop) vs logarithm of time, as in FIG. 4;

5. The slope ($\Delta p/1$ cycle) of the straight line portion of the plot at large times gives the value of $hk_h$, as in the conventional buildup analysis;

6. Extrapolate the straight line portion of the plot to a value of $t=1$ hr., and read the pressure rise (or drop) at that time, which will be denoted as $\Delta p(1)$;

7. Determine $k_v$ from the equation $$k_v = 3790\, \phi\mu ch^2\, \exp\left[\frac{hk_h\Delta p(1)}{70.6q\mu} - F(z/h, z'/h)\right]$$

$$= 3790\, \phi\mu ch^2\, \exp\left[\frac{2.303\Delta p(1)}{\Delta p/1\ \text{cycle}} - F(z/h, z'/h)\right] \quad (21)$$

which follows directly from equation (19) and the definition of $\Delta p(1)$. The geometric factor $F(z/h, z'/h)$ is read from FIG. 3, using the values of $z/h$ and $z'/h$ determined in step 1 hereinabove.

Since the pressures increase during injection of fluids into the reservoir, it follows from equation (20) that the convention that $q>0$ must be observed when injecting into the formation 12. Similarly, $q<0$ when the formation 12 is produced through the perforation (e.g., perforation 17 in FIG. 1). The following is an illustrative example for the case of fluid injection ($q>0$).

EXAMPLE CALCULATION

Figure 4:
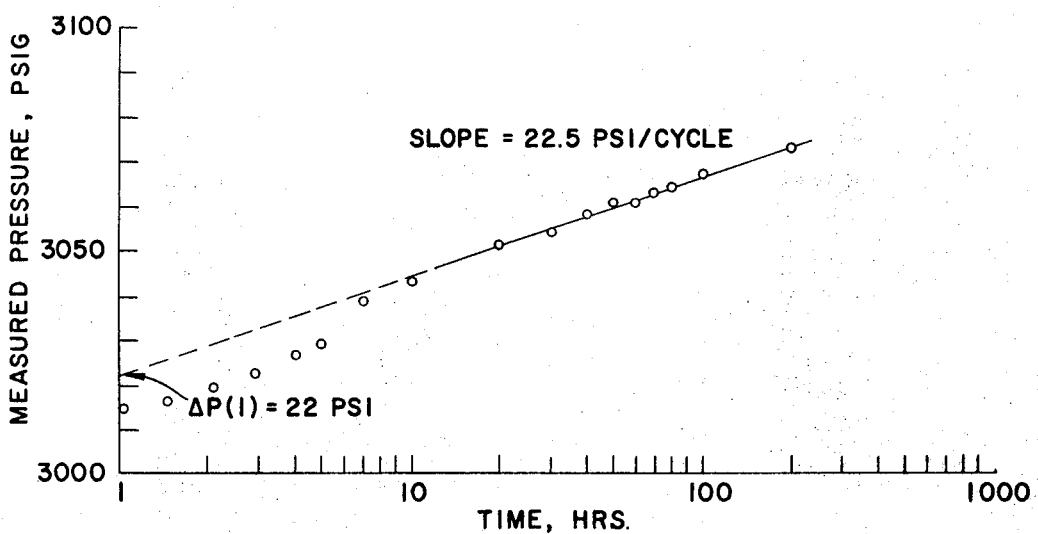

An example calculation is given in order to illustrate the preferred method for determining the vertical permeability of the formation 15. Assuming the pressure response given in FIG. 4, and the following data:

$h = 50$ ft
$z/h = 0.9$, ($z = 45$ ft)
$z'/h = 0.2$, ($z' = 10$ ft)
$q = 50$ B/D
$\mu = 1$ cp
$c = 2 \times 10^{-5}$ psi$^{-1}$
$\phi = 0.1$
$p_i = 3015$ psi From equation (20) and the slope of the curve in FIG. 4, 22.5 p.s.i./1 cycle, it is found that $$k_h = \frac{162.6q\mu}{(\Delta p/1\ \text{cycle})h} = \frac{(162.6)(50)(1)}{(22.5)(50)} = 7.2\ \text{md}.$$

Figure 3:
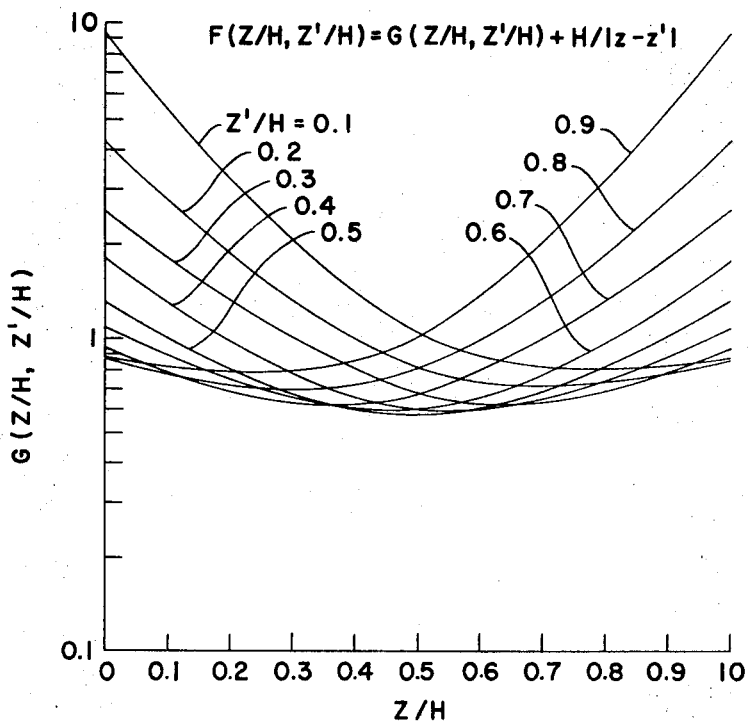
FIGS. 3 and 4 are graphical illustrations of the information derived from the well borehole of FIG. 1.

From FIG. 3, the value of $F(0.9, 0.2)$ is found to be $F(0.9, 0.2) = G(0.9, 0.2) + 1/0.7 = 0.76 + 1.43 = 2.2$.

Extrapolation of the curve of FIG. 4 to $t=1$ hr. obtains $\Delta b(1) = 7$ p.s.i.

Finally, substitution of these quantities in equation (21) gives $$k_v = 3790(0.1)(1)(2 \times 10^{-5})(50)^2\left[\exp\frac{2.303\Delta p(1)}{\Delta p/1\ \text{cycle}} - 2.2\right]$$

$$= 19.6\, \exp(-1.48) = 1.8\ \text{md}.$$

For this example, then, the ratio of vertical to horizontal permeability is 0.25.

Note that the pressure response is initially small in this illustrative example (see FIG. 4). This is considered to be typical of this type of pressure buildup investigation.

Should $\Delta p(1)$ be found to be negative during injection (or positive during production), then the exponent in equation (21) would be negative, and relatively low values of $k_v/k_h$ would be anticipated.

In addition to the limitations regarding the type of well boreholes in which the method of my invention may be used, there may be other practical limitations. For example, if the distance L between the injection (production) interval and the measuring interval is chosen too long and the net vertical permeability is low, the pressure response may not be measurable even in weeks. Or the response may require very sensitive instruments for accurate measurement. On the other hand, if the distance L between the intervals is too short, then the net vertical permeability is only averaged over a short distance. And, of course, if the distance L is comparable to the length of the injection (production) and measuring intervals, then the interpretation may become questionable.

I claim as my invention:

1. A method for quantitatively determining the average vertical permeability of a single subterranean earth formation comprising the steps of:

extending a well borehole into said single earth formation adjacent the portion of said formation desired to be measured;

sealing said well borehole to a point at least adjacent a portion of said single earth formation desired to be measured;

perforating said sealed-off portion of said well borehole by forming perforations at least at two vertically spaced points within said well borehole and opposite said single earth formation;

packing off said well borehole between said two points in said well borehole by placing a packer in said well borehole whereby communication is eliminated between said two points;

flowing fluid through at least one of the perforations at one of said points in said well borehole at a substantially constant mass rate of flow;

determining the position of said two points with respect to the top and bottom of said single earth formation;

measuring the pressure response in said well borehole at the perforations of the other of said points while flowing said fluid through said first-mentioned perforation without flowing fluid through said last-mentioned perforation; and quantitatively determining the average vertical permeability of said single earth formation from the measured pressure response and the position of said two points with respect to the top and bottom of the formation.

2. The method of claim 1 wherein the step of sealing said well borehole includes the step of placing a well casing in said well borehole; and subsequently perforating said well casing at substantially the top and bottom of said single earth formation on which permeability measurements are made.

3. The method of claim 1 wherein the step of perforating said sealed-off portion of said well borehole includes the step of perforating said well borehole at least at two points in said well borehole separated by a distance no less than about 25 well borehole radii.

4. The method of claim 1 wherein the step of perforating said sealed-off portion of said well borehole includes the steps of forming a first series of perforations in said well borehole adjacent substantially to the top of said single earth formation; and forming a second series of perforations in said well borehole adjacent substantially to the top of said single earth formation; and forming a second series of performations in said well borehole adjacent substantially to the bottom of said single earth formation, the step of packing off said perforations including the step of placing packer means in said well borehole between said first and second series of perforations, the length of each series of said perforations being no greater than about 10 percent of the distance between the series of perforations.

5. The method of claim 1 wherein the step of flowing fluid through at least one of the perforations includes the step of producing formation fluid through said perforation.

6. The method of claim 1 wherein the step of flowing fluid through at least one of the perforations includes the step of injecting fluid through said perforation.

7. The method of claim 1 including the step of determining the average vertical permeability ($K_v$) of said single earth formation from the following equation:

$$k_v = 3790 \; \phi\mu c h^2 \; \exp\left\{\frac{2.303 \Delta p(1)}{\Delta p/1 \text{ cycle}} - F(z/h, z'/h)\right\}$$

where $\omega$ = porosity of the formation;
$\mu$ = fluid viscosity in the formation;
$C$ = fluid compressibility of the formation;
$H$ = formation thickness;
$P$ = pressure measured at the perforation being measured minus the initial formation pressure;

where $\omega$ = porosity of the formation;
$\mu$ = fluid viscosity in the formation;
$C$ = fluid compressibility of the formation;
$H$ = formation thickness;
$P$ = pressure measured at the perforation being measured minus the initial formation pressure;
$\Delta p(1) / \Delta p$ at 1 hour;
$F(z/h, z'/h)$ = geometrical function which depends on the position of the flowing and measuring points from the vertical boundaries of the formation;
$z$ = distance measured from the bottom of the formation of perforation at which pressure is measured; and
$z$ = distance of perforation where fluid is flowed, measured from the bottom of the formation.